Feb. 8, 1938.  S. M. NAMPA  2,107,338
CAR LOADING DEVICE
Filed July 18, 1934
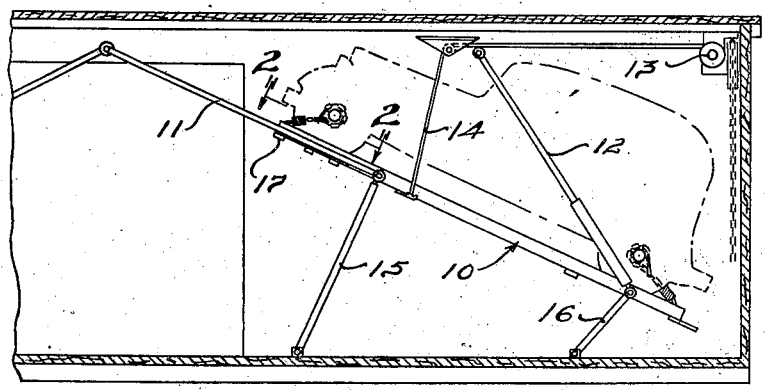
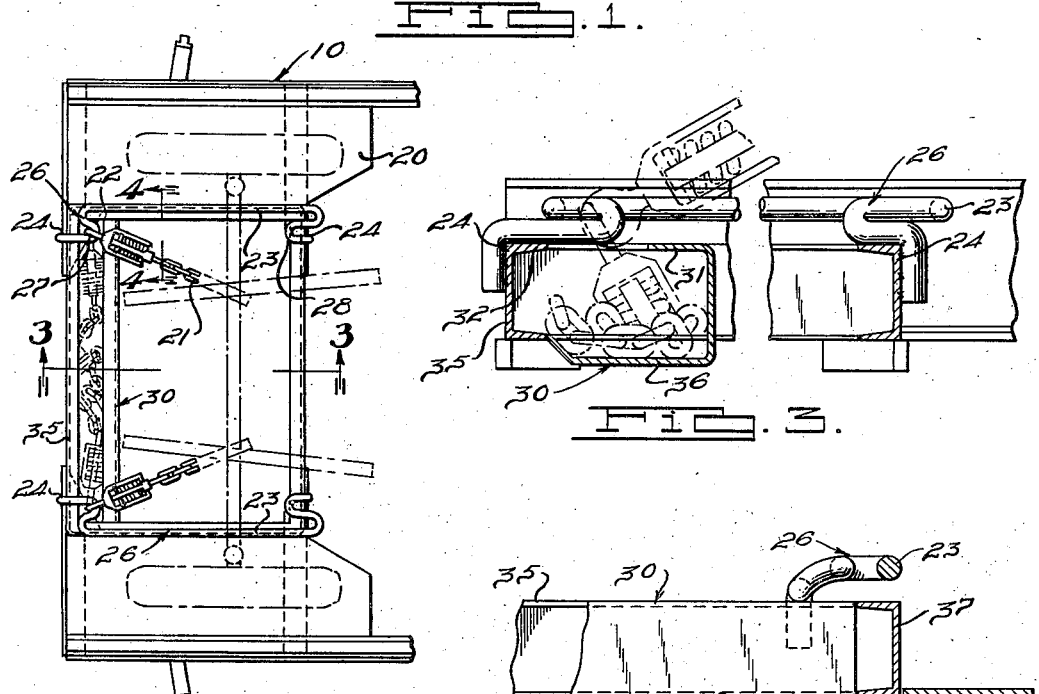
INVENTOR.
Sulo M. Nampa.
BY
Harness, Dickey, Pierce & Hann.
ATTORNEYS.

Patented Feb. 8, 1938

2,107,338

UNITED STATES PATENT OFFICE 2,107,338

CAR LOADING DEVICE

Sulo M. Nampa, Detroit, Mich., assignor to The Worth Company, a corporation of Michigan Application July 18, 1934, Serial No. 735,772

10 Claims. (Cl. 105—368)

The invention relates to loading devices and it has particular relation to devices for loading and supporting automobiles in freight cars for transportation purposes.

In certain respects the invention is related to the car loading device embodied in the application for patent of Samuel D. Butterworth, Serial Number 646,830, filed December 12, 1932. In the above case car loading equipment is disclosed which includes a frame for holding an automobile in a semi-decked position relative to another automobile, and the present invention is concerned with the construction of the frame and arrangement of anchoring devices for holding an automobile thereon. Preferably in anchoring automobiles on frames of this character, chain devices are employed and these should be connected to the frame in such manner that they remain permanently associated with the frame when it is not in use.

One object of the present invention is to provide a frame for the purpose mentioned having flexible anchoring devices and a means for readily housing and retaining the anchoring devices in out of the way positions when the frame is not in use.

Another object of the invention is to provide an improved means for anchoring devices on the frame in a permanent manner while still allowing the connection between the anchoring device and the frame to be shifted between selective positions so as to accommodate automobiles of different dimensions.

Another object of the invention is to provide an anchoring device arrangement such as mentioned wherein the connection between the anchoring device and the frame may be positively held against movement in any position to which it is shifted.

Another object of the invention is to provide an improved type of frame construction which is highly useful for the purpose of loading and supporting automobiles in freight cars during transportation.

Other objects of the invention will become apparent from the following description, the drawing relating thereto and from the claims hereinafter set forth.

For a better understanding of the invention reference may be had to the drawing, wherein:

Figure 1 is a fragmentary and elevational view of a car loading device as employed in a freight car, wherein the device includes a frame constructed according to one form of the invention.

Fig. 2 is a fragmentary plan view of the frame as seen from the line 2—2 of Fig. 1.

Fig. 3 is a cross-sectional view on a larger scale taken substantially along the line 3—3 of Fig. 2.

Fig. 4 is a cross-sectional view on a larger scale taken substantially along the line 4—4 of Fig. 2.

As shown by Fig. 1, the frame for supporting the automobile is indicated at 10 and it is pivotally connected to front rods 11 and rear rods 12. The frame with an automobile thereon is elevated by means of hoisting mechanism 13 including cables 14 connected to opposite sides of the frame and when the frame is in its semi-decking position as shown, it is adapted to be supported by bracing rods 15 and 16. The rods 12 are of telescopic character and when the parts are in the decking position hooks or abutments 17 on the frame engage the rods 11 from which it follows that further elevation of the frame with the automobile removed, causes the rods and frame to swing as a unit about the upper ends of the rods during which the rods 12 become shorter in length. This permits elevation of the equipment to a position adjacent the roof where it is out of the way. In general, this construction and arrangement and its manner of operation are clearly disclosed in the application for patent previously mentioned.

Now as shown by Fig. 2 particularly, the frame 10 is of rectangular shape and is provided at its corners with short channelways 20 each of which is adapted to receive one of the wheels on the automobile. For anchoring the automobile as thus positioned, chain anchoring devices 21 are provided which preferably are adapted to be swung around the axles of the automobile. Each of these chain devices includes an eye 22 which engages a rod 23 that extends along the inner side of the channelways 20 and which has its opposed ends welded or otherwise rigidly secured to the frame at points indicated at 24. At both ends each of the rods 23 has S-shaped portions 26 which provide anchoring bends 27 and 28 at the ends of the rods and with the chains in the position shown in Fig. 2, the bend 27 positively anchors the eye 22 on the chain and prevents movement of the eye along the rod. When the chain is released from the axle of the automobile, the eye 22 may be moved away from the bend and around the S-shaped portion and longitudinally of the rod to the other end thereof where it may be engaged with the bent portion 28. Occasionally vehicles are supported on the frame wherein it is desirable that the chain anchoring devices either at the front or rear end of the frame or at both places, be reversed in direction as an axle of the automobile may be further toward the end of the frame and in this case it may be desirable that the chain extend in the opposite direction and be anchored at the opposite end of the rod 23. It will be apparent, however, that the chain remains permanently connected to the rod so that it is always carried by the frame.

It will also be noted that each S shaped end of the rods provides two anchoring bends and that the chain may be reversed in direction at each end of the rod by moving the eye 22 into the second bent portion and then reversing the direction of the chain. In other words, the chain can be anchored at two points at each end of the rod wherein one of such anchoring points permits extending the chain in one direction and wherein the other point permits extending the chain in the opposite direction. Thus each rod provides four anchoring points, two for anchoring the chain at spaced points when the latter extends in one direction, and two for anchoring the chain at spaced points when the latter extends in the other direction.

In view of the fact that the equipment is stored adjacent the roof when not in use, it is desirable that the chain anchoring devices be retained in out-of-the-way positions and be prevented from hanging below the frame where the ends thereof might engage other objects being shipped or even engage persons in the freight car. The retention of the chain anchoring devices in the present invention is effected by providing a channelway 30, as shown by both Figs. 2 and 3, which extends transversely of the frame between the channelways 20 and which preferably is located at the extreme ends of the frame. The ends of the channelway 30 underlie the bent portions 27 of the rods 23 and hence when the chain anchoring devices are released from the axle and when the eye portions 22 engage the bends 27, the chains can be swung into positions over the channelway and then allowed to drop thereinto. Each of the channelways 30 accommodates both of the chain anchoring devices at the end of the frame. It will be noted that the channelway 30 has overhanging upper portions or flanges 31 and 32 and these are desirable in that they prevent the chains from being jerked out of the channelway during movement of the freight car and hence positively insure retention of the chain devices in the channelway. The channelway 30 may be formed in different ways but in the case shown the front side comprises a separate channel iron 35 which forms a part of the frame construction and the main portion of the bottom of the channelway and the rear side thereof may be a separate channel member 36 welded at its ends to other parts of the frame as will be readily understood. Other channel irons 37 forming a part of the frame construction and extending along the inner edges of the channelways 20 for the wheels, serve effectively for closing the ends of the channelway 30 and preventing endwise movement of the chain devices from the ends of said channelway. The ends of the iron 36, as shown by Fig. 4, may be welded to the legs of the channel 37.

The invention particularly provides an improved frame construction wherein the chain devices are anchored in an improved and efficient manner which permits changing the anchoring points of the chain very easily without releasing the connection with the frame. Furthermore, the invention provides a novel and efficient means for accommodating the chains when not in use so as to prevent them hanging below the frame when the latter is in an out-of-the-way position.

Although only one form of the invention has been described and illustrated in detail, it will be apparent to those skilled in the art that various modifications may be made without departing from the scope of the appended claims.

I claim:

1. In combination with a freight car, an elongated rod operatively anchored in the car, an anchoring device adapted to be connected to an automobile or the like and having an eye slidably receiving the rod, and means comprising reversely related bends at one end of the rod providing recesses open towards opposite ends of the rod for anchoring the eye selectively in positions where the device may extend in opposite directions longitudinally of the rod.

2. In combination with a freight car, an elongated rod operatively anchored in the car, an anchoring device adapted to be connected to an automobile or the like and having an eye slidably receiving the rod, said rod being so bent as to provide oppositely opening loops for anchoring the eye selectively in positions wherein the device may extend in opposite directions longitudinally of the rod.

3. In combination with a freight car, an elongated rod operatively anchored in the car, an anchoring device adapted to be connected to an automobile or the like and having an eye slidably receiving the rod, said rod being so bent as to provide a pair of oppositely opening loops at each end thereof for anchoring the eye selectively in positions wherein the device may extend at opposite directions longitudinally of the rod from either end thereof.

4. In combination with a freight car, an elongated rod operatively anchored in the car, an anchoring device adapted to be connected to an automobile or the like and having an eye slidably receiving the rod, and means comprising reversely related bends at each end open towards opposite ends of the rod for anchoring the eye selectively in positions wherein the device may extend in opposite directions longitudinally of the rod from each end thereof.

5. In combination with an automobile supporting frame, a rod operatively secured to the frame, an anchoring device adapted to be connected to an automobile and having an eye slidably receiving the rod, said rod being so bent as to provide oppositely opening loops for anchoring the eye selectively in positions wherein the device may extend in opposite directions longitudinally of the frame.

6. In a car loading device, a movable frame including a pair of longitudinally extending members adapted to receive the wheels of a vehicle, a pair of flexible vehicle anchor devices permanently connected to the frame at the inner sides of adjacent ends of the members respectively, and a housing carried by the frame intermediate said members for receiving said anchoring devices when not in use.

7. In a car loading device, a movable frame including a pair of longitudinally extending members adapted to receive the wheels of a vehicle, a pair of flexible vehicle anchoring devices permanently connected to the frame at the inner sides of adjacent ends of the members respectively, and means forming a trough intermediate said members for receiving said anchoring devices when not in use, said means forming a transverse frame member.

8. In a car loading device, a movable frame including a pair of longitudinally extending members adapted to receive the wheels of a vehicle, a pair of flexible vehicle anchoring devices permanently connected to the frame at the inner sides of adjacent ends of the members respectively, and a transverse frame member of substantial box section connecting said ends of the members, said transverse frame member being open at the top thereof whereby the anchoring devices may be stored within said member when not in use.

9. In combination with an automobile supporting frame comprising longitudinally extending members for receiving the wheels of an automobile, a pair of rods at one end of the frame extending longitudinally thereof adjacent the inner sides of said members respectively and having their ends rigidly secured to the frame, anchoring devices slidable on the rods, said rods being adapted to anchor said devices in at least one position along the respective rods for anchoring an automobile on the frame, and housing means carried by the frame between the members for receiving the anchoring devices when not in use.

10. In combination with an automobile supporting frame comprising longitudinally extending members for receiving the wheels of an automobile, a pair of rods at one end of the frame extending longitudinally thereof adjacent the inner sides of said members respectively and having their ends rigidly secured to the frame, devices slidable on the rods for anchoring an automobile on the frame, each of said rods having reversely related bands at one end thereof for anchoring said devices in position on said rods, and housing means carried by the frame intermediate the members for receiving the anchoring devices when not in use without requiring their disconnection from the rods.

SULO M. NAMPA.